United States Patent
Namazue (10) Patent No.: US 7,675,205 B2
(45) Date of Patent: Mar. 9, 2010

(54) DRIVING APPARATUS

(75) Inventor: Eriko Namazue, Tokyo (JP)

(73) Assignee: Canon Kabushiki Kaisha (JP)

( * ) Notice: Subject to any disclaimer, the term of this patent is extended or adjusted under 35 U.S.C. 154(b) by 352 days.

(21) Appl. No.: 11/623,508

(22) Filed: Jan. 16, 2007

(65) Prior Publication Data

US 2007/0164629 A1 Jul. 19, 2007

(30) Foreign Application Priority Data

Jan. 16, 2006 (JP) ............................. 2006-007974

(51) Int. Cl.
*H02K 37/14* (2006.01)
(52) U.S. Cl. ............... 310/49.13; 310/49.15; 310/49.23
(58) Field of Classification Search ............... 310/49 R, 310/257, 194
See application file for complete search history.

(56) References Cited

U.S. PATENT DOCUMENTS 7,446,442 B2 * 11/2008 Horiike ..................... 310/49 R 2005/0236914 A1 * 10/2005 Horiike ..................... 310/49 R

FOREIGN PATENT DOCUMENTS

| JP | 2005312171 A | * 11/2005 |
| JP | 2006-217733 A | 8/2006 |

\* cited by examiner

*Primary Examiner*—Tran N Nguyen
(74) *Attorney, Agent, or Firm*—Rossi, Kimms & McDowell LLP (57) ABSTRACT

A driving apparatus that can be made compact, without increasing the number of component parts and decreasing diameters of a rotating shaft and bearings. When a first unit assembled from a first stator and a first bobbin is coupled to a second unit assembled from a second stator and a second bobbin, engaging portions of the first bobbin are caused by a first switching member to shift from a disengaged state from the first stator to an engaged state with the first stator, and a second switching member, and engaging portions of the second bobbin are caused by a second switching member to shift from a disengaged state from the second stator to an engaged state with the second stator.

3 Claims, 8 Drawing Sheets

DRIVING APPARATUS

BACKGROUND OF THE INVENTION

1. Field of the Invention

The present invention relates to a driving apparatus that is applied to a stepping motor formed into a cylindrical shape.

2. Description of the Related Art

Conventionally, cylindrical stepping motors have been developed and put into practice, having a rotating shaft caused to rotate by switching the directions of power supply to motor coils to switch the polarities of outer and inner magnetic pole portions. In these stepping motors, there is a demand that the motor diameter be reduced and the motor output be improved.

SUMMARY OF THE INVENTION

To cope with the demand, a stepping motor having a reduced motor diameter around the rotating shaft and an increased motor output was proposed by the present assignee (refer to Japanese Laid-open Patent Publication No. 2006-217733 corresponding to Japanese Patent Application No. 2005-027869).

Figure 7:
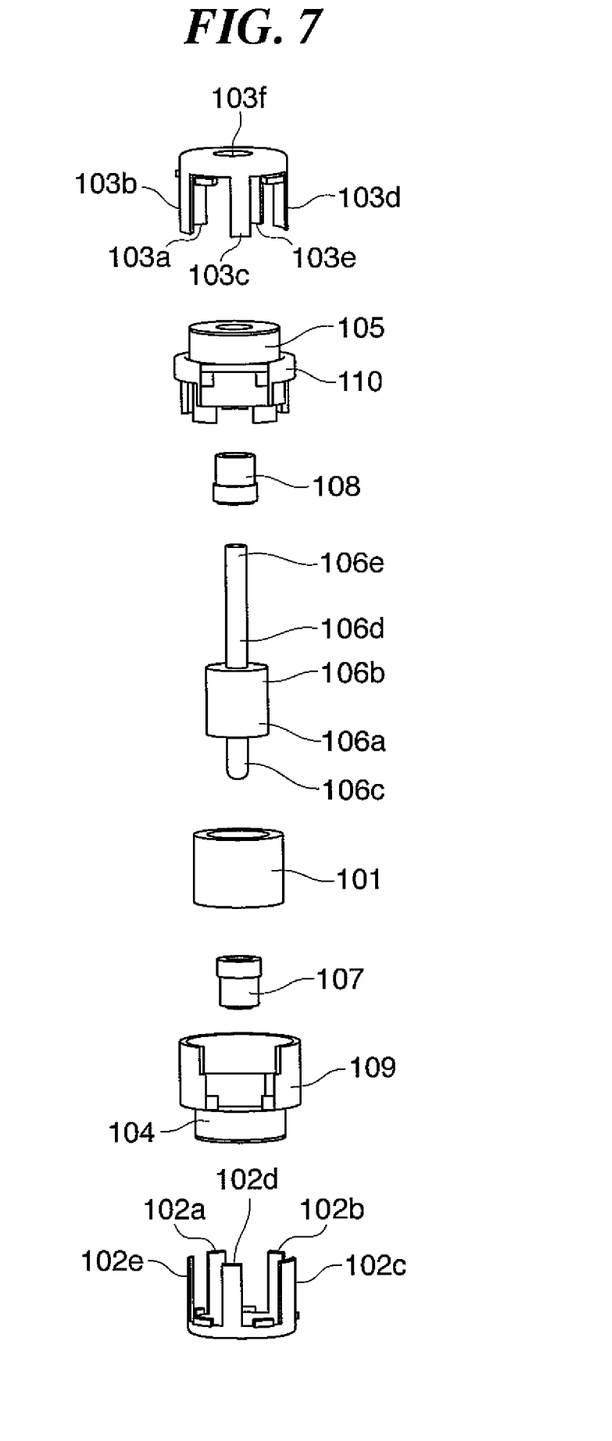
FIG. 7 is an exploded perspective view showing the construction of a stepping motor proposed by the assignee of this application.
Figure 8:
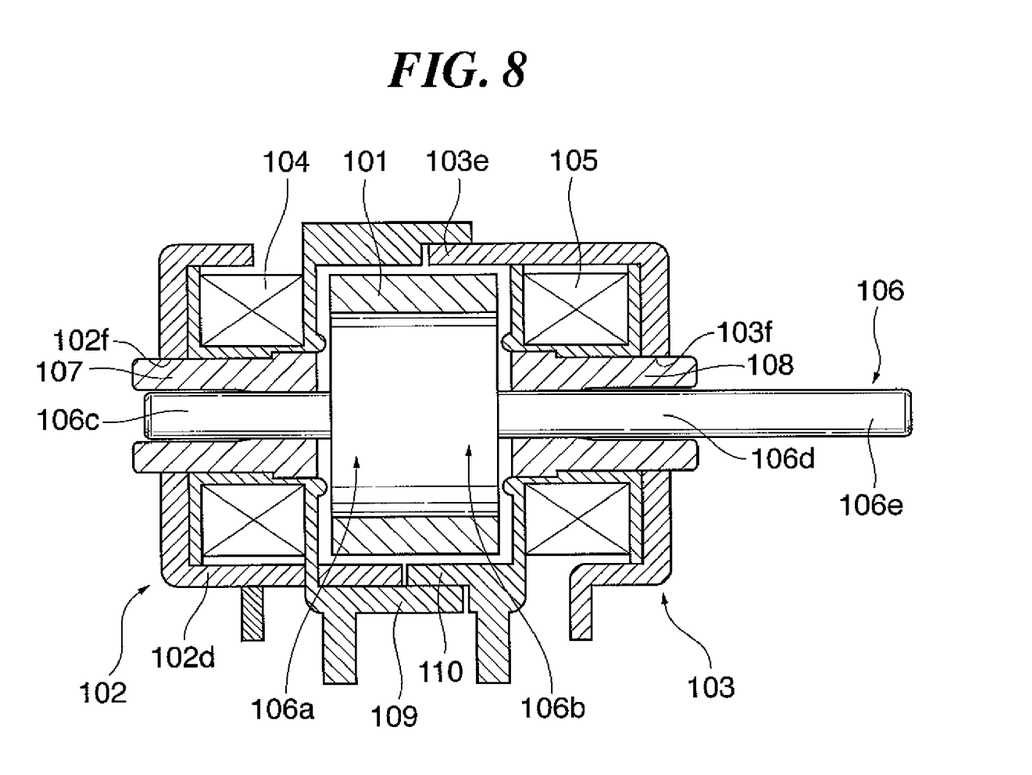
FIG. 8 is a sectional view of the stepping motor shown in FIG. 7.

FIG. 7 is an exploded perspective view showing the construction of the stepping motor proposed in Japanese Laid-open Patent Publication No. 2006-217733, and FIG. 8 is a section view of the stepping motor shown in FIG. 7.

Referring to FIGS. 7 and 8, a magnet 101 is formed into a cylindrical shape and circumferentially magnetized. A stator 102 made of a soft magnetic material includes first magnetic pole portions 102a to 102e facing an outer peripheral surface of the magnet 101 with a clearance and includes a hole portion 102f. A second stator 103 made of a soft magnetic material includes second magnetic pole portions 103a to 103e facing the outer peripheral surface of the magnet 101 with a clearance and includes a hole portion 103f. First and second coils 104, 105 are formed into a cylindrical shape and respectively wound around first and second bobbins 109, 110.

A rotating shaft 106 is made of a soft magnetic material and includes first and second inner magnetic pole portions 106a, 106b and an output portion 106e. The first inner magnetic pole portions 106a of the rotating shaft 106 are formed in that axial range of the rotating shaft 106 in which they face the first outer magnetic pole portions 102a to 102e of the first stator 102 which face the magnet 101, so as to sandwich the magnet 101 between the inner and outer magnetic pole portions. The second inner magnetic pole portions 106b are formed in that axial range of the rotating shaft 106 in which they face the second magnetic pole portions 103a to 103e of the second stator 103 so as to sandwich the magnet 101 between the inner and outer magnetic pole portions.

First and second bearings 107, 108 made of a soft magnetic material are respectively fixed in the hole portions 102f, 103f of the first and second stators 102, 103. As a result, the first bearing 107 and the first stator 102 are magnetically coupled to each other, and the second bearing 108 and the second stator 103 are magnetically coupled to each other.

The rotating shaft 106 is rotatably held by having a shaft portion 106c thereof fitted into an inner diameter portion of the first bearing 107. At that fitting part, the first bearing 107 is magnetically coupled to the rotating shaft 106, and the first bearing 107 serves as part of the first inner magnetic pole portions. With this arrangement, the first stator 102 and the rotating shaft 106 are magnetically coupled to each other via the first bearing 107. The second stator 103 and the rotating shaft 106 are also magnetically coupled via the second bearing 108.

In the above arrangement, the respective polarities of the first and second outer magnetic pole portions 102a to 102e and 103a to 103e and the first and second inner magnetic pole portions 106a, 106b are switched by switching the directions of electric supply to the first and second coils 104, 105, whereby the rotating shaft 106 is caused to rotate.

In the proposed stepping motor, the first bobbin 109 is held and fixed between the first bearing 107 and the first stator 102. Similarly, the second bobbin 110 is fixed between the second bearing 108 and the second stator 103.

As shown in FIG. 8, in the above proposed motor, the first and second bobbins 109, 110 are respectively placed between the first bearing 107 and the first stator 102 and between the second bearing 108 and the second stator 103, and corresponding ones of the bearings and the stators are press-fitted together whereby the bobbins are fixed therebetween. With this arrangement, there is a fabrication limitation in making the stepping motor more compact. To make the stepping motor compact, the first and second bearings 107, 108 and the rotating shaft 106 must be decreased in diameter. This makes it difficult for the magnetic flux to flow through the bearings and rotating shaft, posing a problem that the performance of the stepping motor is lowered.

An object of the present invention is to provide a driving apparatus that can be made compact, without increasing the number of component parts and without decreasing the diameters of a rotating shaft and bearings.

To attain the object, according to the present invention, there is provided a driving apparatus comprising a cylindrical magnet circumferentially magnetized, a first stator for being excited by a first coil, a second stator for being excited by a second coil, a first bobbin for fixing the first coil, the first bobbin including at least one first engaging portion for being shifted between a disengaged state from the first stator and an engaged state with the first stator, a second bobbin for fixing the second coil, the second bobbin including at least one second engaging portion for being shifted between a disengaged state from the second stator and an engaged state with the second stator, at least one first switching member for shifting the first engaging portion of the first bobbin from the disengaged state from the first stator to the engaged state with the first stator when a first unit assembled from the first stator and the first bobbin is coupled to a second unit assembled from the second stator and the second bobbin, and at least one second switching member for shifting the second engaging portion of the second bobbin from the disengaged state from the second stator to the engaged state with the second stator when the first unit is coupled to the second unit.

According to the present invention, when the first unit assembled from the first stator and the first bobbin is coupled to the second unit assembled from the second stator and the second bobbin, the first and second switching members provided in the first and second stators or the first and second bobbins cause the first and second engaging portions provided in the first and second bobbins to shift from the disengaged state to the engaged state. As a result, it is possible to attain a compact driving apparatus without increasing the number of component parts by eliminating the necessity of additionally providing members for fixing the first stator and the first bobbin together and the second stator and the second bobbin together and without decreasing the diameters of a rotating shaft and bearings.

Preferably, the first switching member is provided in the second stator, and the second switching member is provided in the first stator, and when the first stator is coupled to the second bobbin, the second switching member provided in the first stator causes the second engaging portion of the second bobbin to shift from the disengaged state from the second stator to the engaged state with the second stator, and when the second stator is coupled to the first bobbin, the first switching member provided in the second stator causes the first engaging portion of the first bobbin to shift from the disengaged state from the first stator to the engaged state with the first stator.

More preferably, the first stator includes a first stator base portion and a plurality of first tooth-shaped magnetic pole portions axially extending from the first stator base portion, at least one of the first magnetic pole portions having a tip end portion thereof forming the second switching member, the second stator includes a second stator base portion and a plurality of second tooth-shaped magnetic pole portions axially extending from the second stator base portion, at least one of the second magnetic pole portions having a tip end portion thereof forming the first switching member, and the first bobbin includes a first bobbin base portion and a plurality of tooth-shaped first jaw portions thereof axially extending from the first bobbin base portion and each having opposite side edges, at least one of the first jaw portions being provided with the first engaging portion in at least one of the opposite side edges thereof, each of the first magnetic pole portions being inserted between corresponding adjacent ones of the first jaw portions, and the at least one first jaw portion or at least one different first jaw portion being formed with at least one first recess into which the first switching member formed by the tip end portion of the second magnetic pole portion can be inserted, the second bobbin includes a second bobbin base portion and a plurality of tooth-shaped second jaw portions thereof axially extending from the second bobbin base portion and each having opposite side edges, at least one of the second jaw portions being provided with the second engaging portion in at least one of the opposite side edges thereof, each of the second magnetic pole portions being inserted between corresponding adjacent ones of the first jaw portions, and the at least one first jaw portion or at least one different first jaw portion being formed with at least one second recess into which the second switching member formed by the tip end portion of the first magnetic pole portion can be inserted.

Alternatively, the first switching member is provided in the second bobbin, and the second switching member is provided in the first bobbin, and when the first bobbin is coupled to the second bobbin, the second switching member provided in the first bobbin causes the second engaging portion of the second bobbin to shift from the disengaged state from the second stator to the engaged state with the second stator, and when the second bobbin is coupled to the first bobbin, the first switching member provided in the second bobbin causes the first engaging portion of the first bobbin to shift from the disengaged state from the first stator to the engaged state with the first stator.

More preferably, the first stator includes a first stator base portion and a plurality of tooth-shaped first magnetic pole portions axially extending from the first stator base portion, the second stator includes a second stator base portion and a plurality of tooth-shaped second magnetic pole portions axially extending from the second stator base portion, the first bobbin includes a first bobbin base portion and a plurality of tooth-shaped first jaw portions thereof axially extending from the first bobbin base portion and each having opposite side edges, at least one of the first jaw portions being provided with the first engaging portion in at least one of the opposite side edges thereof, each of the first magnetic pole portions being inserted between corresponding adjacent ones of the first jaw portions, and the at least one first jaw portion or at least one different first jaw portion has a tip end portion thereof forming the second switching member, the second bobbin includes a second bobbin base portion and a plurality of tooth-shaped second jaw portions thereof axially extending from the second bobbin base portion and each having opposite side edges, at least one of second jaw portions being provided with the second engaging portion in at least one of the opposite side edges thereof, each of the second magnetic pole portions being inserted between corresponding adjacent ones of the second jaw portions, and the at least one second jaw portion or at least one different second jaw portion has a tip end portion thereof forming the first switching member, the first bobbin is formed with at least one first recess into which the tip end portion of the second jaw portion of the second bobbin forming the first switching member can be inserted, and the second bobbin is formed with at least one second recess into which the tip end portion of the first jaw portion of the first bobbin forming the second switching member can be inserted.

Preferably, the first and second stators each include tooth-shaped magnetic pole portions axially extending, and the first and second bobbins each include tooth-shaped jaw portions axially extending.

Further features of the present invention will become apparent from the following description of exemplary embodiments with reference to the attached drawings.

DETAILED DESCRIPTION OF THE PREFERRED EMBODIMENTS

The present invention will now be described in detail below with reference to the drawings showing preferred embodiments thereof.

First Embodiment

Figure 1:
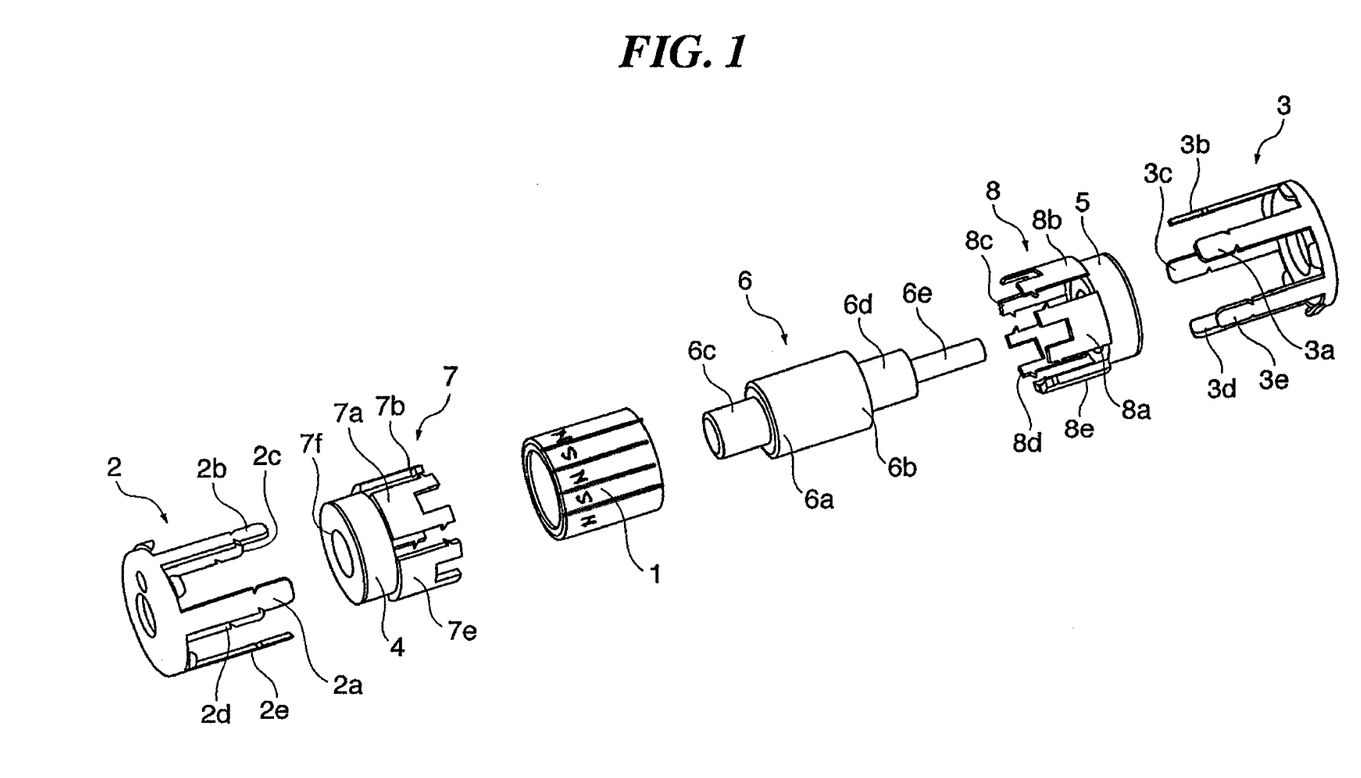
FIG. 1 is an exploded perspective view showing the construction of a stepping motor as a driving apparatus according to a first embodiment of the present invention.
Figure 2A:
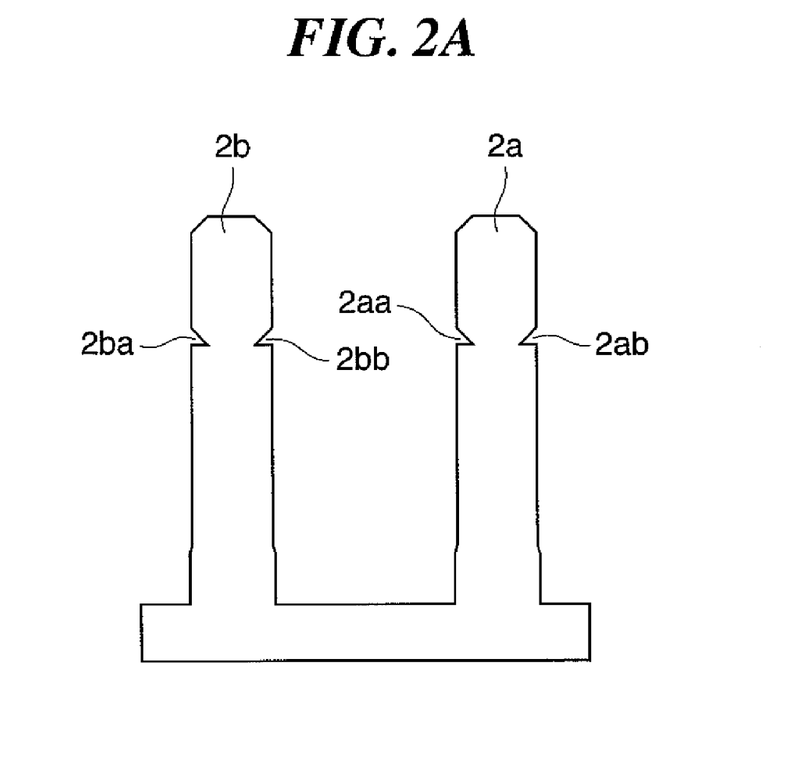
FIG. 2A is a fragmentary development view showing outer magnetic pole portions of a first stator in the stepping motor shown in FIG. 1.
Figure 2B:
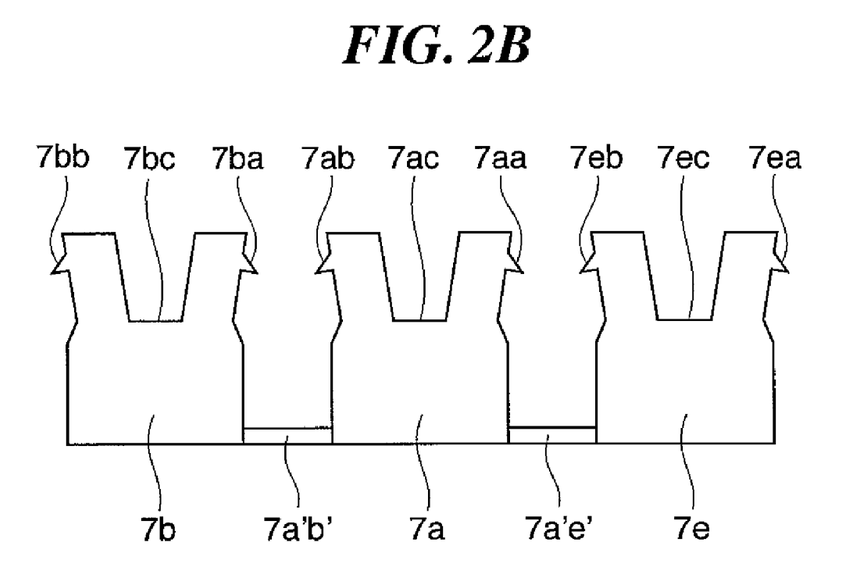
FIG. 2B is a fragmentary development view showing jaw portions of a first bobbin in the stepping motor shown in FIG. 1.
Figure 3A:
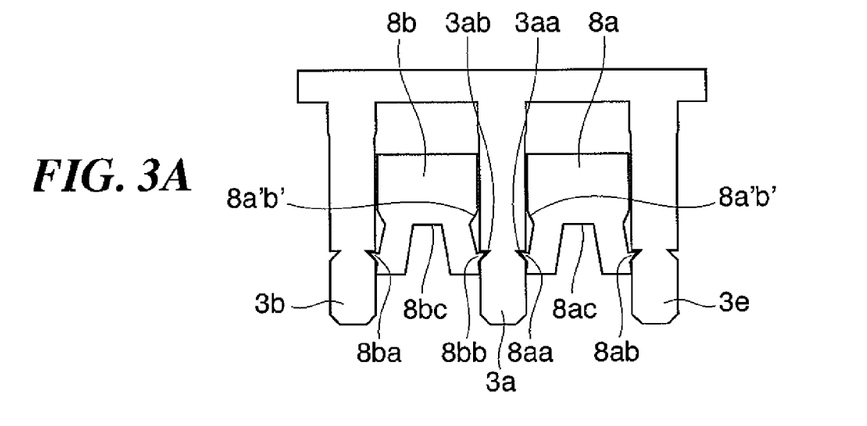
FIG. 3A is a fragmentary development view showing outer magnetic pole portions of a second stator and jaw portions of a second bobbin in the stepping motor shown in FIG. 1.

FIG. 1 is an exploded perspective view showing the construction of a stepping motor as a driving apparatus according to a first embodiment of the present invention. FIG. 2A is a fragmentary development view showing outer magnetic pole portions of a first stator, and FIG. 2B is a fragmentary development view showing jaw portions of a first bobbin. FIG. 3A is a fragmentary development view showing outer magnetic pole portions of a second stator and jaw portions of a second bobbin, FIG. 3B is a fragmentary development view showing the outer magnetic pole portions of the first stator and the jaw portions of the first bobbin, and FIG. 3C is a view showing the outer magnetic pole portions of the first and second stators and the jaw portions of the first and second bobbins.

Figure 3B:
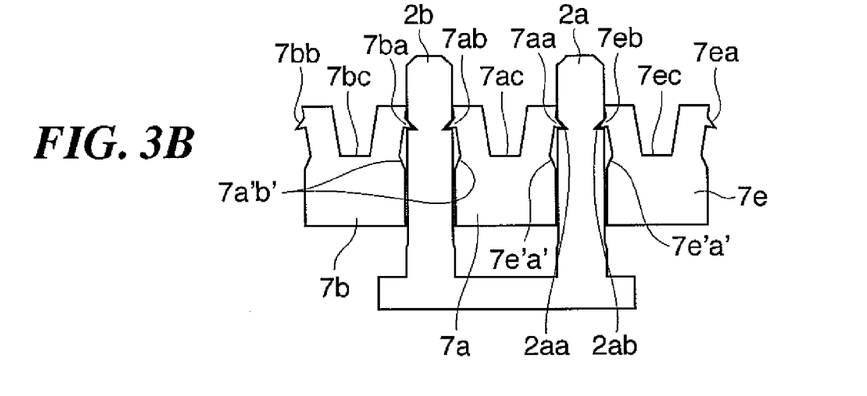
FIG. 3B is a fragmentary development view showing the outer magnetic pole portions of the first stator and the jaw portions of the first bobbin in the stepping motor shown in FIG. 1.
Figure 3C:
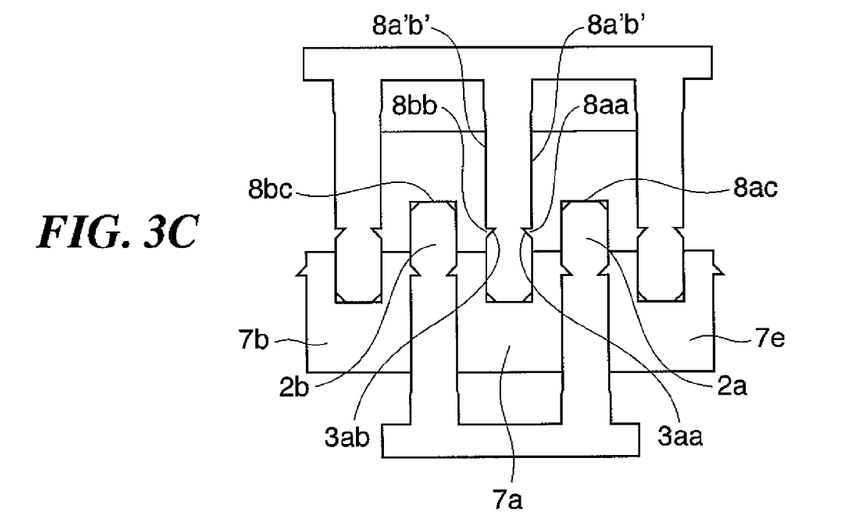
FIG. 3C is a fragmentary development view showing the outer magnetic pole portions of the first and second stators and the jaw portions of the first and second bobbins in the stepping motor shown in FIG. 1.

Referring to FIGS. 1 to 3, the stepping motor is comprised of a magnet 1, first and second stators 2, 3, first and second coils 4, 5, a rotating shaft 6, and first and second bobbins 7, 8.

The magnet 1 is formed into a cylindrical shape and has an outer peripheral surface thereof circumferentially divided into magnetized portions, which are alternatively magnetized into S and N poles.

The first stator 2 is made of a soft magnetic material, and includes a circular disk-shaped base portion and first tooth-shaped outer magnetic pole portions 2a to 2e axially extending from the base portion and disposed at equal intervals in the circumferential direction. The first outer magnetic pole portions 2a to 2e are respectively formed with notches 2aa, 2ab; 2ba, 2bb; 2ca, 2cb; 2da, 2db; and 2ea, 2eb. The first outer magnetic pole portions 2a to 2e are disposed so as to face an outer peripheral surface of the magnet 1 with a predetermined clearance therebetween. It should be noted that only those notches which are formed in some of the first outer magnetic pole portions are illustrated in FIG. 2, with illustrations of the other notches omitted.

The second stator 3 is made of a soft magnetic material and includes a circular disk-shaped base portion and second tooth-shaped outer magnetic pole portions 3a to 3e axially extending from the base portion and circumferentially disposed at equal intervals. The second outer magnetic pole portions 3a to 3e are respectively formed with notches. 3aa, 3ab; 3ba, 3bb; 3ca, 3cb; 3da, 3db; and 3ea, 3eb. The second outer magnetic pole portions 3a to 3e are disposed so as to face the outer peripheral surface of the magnet 1 with a predetermined clearance. In FIG. 3, only notches formed in some of the second outer magnetic pole portions are illustrated, with illustrations of the other notches omitted.

The first coil 4 is formed into a cylindrical shape and wound around the first bobbin 7, the first coil 4 being used for exciting the first outer magnetic pole portions 2a to 2e of the first stator 2. The second coil 5 is formed into a cylindrical shape and wound around the second bobbin 8, the second coil 5 being used for exciting the second outer magnetic pole portions 3a to 3e of the second stator 3. The first and second coils 4, 5 are formed to have their outer diameters that are substantially equal to that of the magnet 1.

The rotating shaft 6 is made of a soft magnetic material and comprised of first and second inner magnetic pole portions 6a, 6b, shaft portions 6c, 6d, and an output portion 6e. The shaft portions 6c, 6d of the rotating shaft 6 are respectively inserted into inner diameter portions of the first and second coils 4, 5, and the rotating shaft 6 is adhered and fixed to an inner diameter portion of the magnet 1.

The first inner magnetic portions 6a are formed in an axial range of the rotating shaft 6 so as to face the first outer magnetic pole portions 2a to 2e facing the magnet 1, whereby the magnet 1 is sandwiched between the first inner magnetic pole portions 6a and the first outer magnetic pole portions 2a to 2e. When the first coil 4 is supplied with electric power, the first inner magnetic pole portions 6a of the rotating shaft 6 are excited with opposite polarity to that of the first outer magnetic pole portions 2a to 2e of the first stator 2. Similarly, the second inner magnetic pole portions 6b are formed in an axial range of the rotating shaft 6 in which they face the second outer magnetic pole portions 3a to 3e of the second stator 3 facing the magnet 1, so that the magnet 1 is sandwiched between the second inner magnetic pole portions 6b and the second outer magnetic pole portions 3a to 3e. When the electric power is supplied to the second coil 5, the second inner magnetic pole portions 6b are excited with opposite polarity to that of the second outer magnetic pole portions 3a to 3e.

The magnet 1 is fixed to the first or second inner magnetic pole portions 6a or 6b of the rotating shaft 6. The magnet 1 has a construction that the inner diameter portion thereof is embedded with the first and second inner magnetic pole portions 6a, 6b, which makes it possible to increase the mechanical strength of the magnet 1. In addition, the first and second inner magnetic pole portions 6a, 6b act as a back metal, to thereby permit the magnetic circuit to have an increased permeance coefficient. This makes it possible to reduce magnetic degradation of the stepping motor due to demagnetization even if the stepping motor is used under high temperature circumstances.

The first bobbin 7 is formed by resin molding and comprised of a cylindrical portion 7f and tooth-shaped jaw portions 7a to 7e axially extending from the cylindrical portion 7f. The first coil 4 is wound around the outer circumference of the cylindrical portion 7f. The jaw portion 7a is formed with projections 7aa, 7ab and a notch 7ac. Each of the other jaw portions 7b to 7e is formed with similar projections and a notch.

The second bobbin 8 is formed by resin molding and comprised of a cylindrical portion 8f (not shown in FIG. 1) and tooth-shaped jaw portions 8a to 8e axially extending from the cylindrical portion 8f. The second coil 5 is wound around the outer periphery of the cylindrical portion 8f. The jaw portion 8a is formed with projections 8aa, 8ab and a notch 8ac. Each of the other jaw portions 8b to 8e is formed with similar projections and a notch.

Next, explanations will be given of how the stepping motor of the present embodiment is assembled and how the first stator 2 and the first bobbin 7 are fixed together and the second stator 3 and the second bobbins 8 are fixed together.

First, the first stator 2 and the first bobbin 7 are assembled into a first stator/bobbin unit and the second stator 3 and the second bobbin 8 are assembled into a second stator/bobbin unit. In the following, a detailed explanation will be given.

To assemble the first stator 2 and the first bobbin 7 together, the first outer magnetic pole portions 2a to 2e of the first stator 2 are respectively inserted into engaging portions between adjacent jaw portions of the first bobbin 7. For example, the first outer magnetic portion 2a of the first stator 2 is inserted into the engaging portion 7e'a' between the jaw portions 7a, 7e of the first bobbin 7 (refer to FIG. 3B). The outer magnetic pole portion 2b of the first stator 2 is inserted into the engaging portion 7a'b' between the jaw portions 7a, 7b of the first bobbin 7 (refer to FIG. 3B). In the same manner, the second stator 3 and the second bobbin 8 are assembled together, whereby the assemblage of the first and second stator/bobbin units is completed.

As shown in FIG. 3B, in the first stator/bobbin unit, there is a slight clearance between the first outer magnetic pole portion 2a of the first stator 2 and the engaging portion 7e'a' between the jaw portions 7a, 7e of the first bobbin 7. Similarly, slight clearances are formed when the first outer magnetic pole portions 2b to 2e are each inserted into a corresponding one of the engaging portions 7a'b', 7b'c', 7c'd', and 7d'e' between the jaw portions 7a to 7e of the first bobbin 7. As a result, the first stator 2 and the first bobbin 7 are in a non-engaged (disengaged) state. It should be noted that only some of the jaw portions and the engaging portions are illustrated in FIG. 3, with illustrations of the others omitted. Each of the engaging portions of the first bobbin 7 can be switched between a disengaged state and an engaged state.

In the second stator/bobbin unit, as shown in FIG. 3A, when the second magnetic pole portions 3a to 3e of the second stator 3 are each inserted between corresponding ones of the jaw portions 8a to 8e of the second bobbin 8, a slight clearance is produced therebetween. As a result, the second stator 3 and the second bobbin 8 are in a disengaged state. It should be noted that only some of the jaw portions and the engaging portions are illustrated in FIG. 3, with illustrations of the remaining ones being omitted. The engaging portions of the second bobbin 8 can be switched between a disengaged state from the second stator 3 and an engaged state with the second stator 3.

Next, the shaft portion 6c of the rotating shaft 6 to which the magnet 1 is affixed is inserted into the inner diameter portion of the first stator/bobbin unit, and the shaft portion 6d of the rotating shaft 6 is inserted into the inner diameter portion of the second stator/bobbin unit. How the first and second stator/bobbin units are assembled and fixed together will be explained in detail below.

As shown in FIGS. 3A to 3C, when the first outer magnetic pole portions 2a, 2b of the first stator 2 are inserted into the notches 8ac, 8bc formed in the jaw portions of the second bobbin 8, external periphery of the notches 8ac, 8bc is pressed by the first outer magnetic pole portions 2a, 2b of the first stator 2, whereby the projections 8aa, 8bb of the second bobbin 8 are made in engagement with the notches 3aa, 3ab of the second stator 3, respectively. As a result, the engaging portion 8a'b' of the second bobbin 8 is made in an engaged state, so that the second outer magnetic pole portion 3a of the second stator 3 is fixed.

Similarly, when the remaining first outer magnetic pole portions of the first stator 2 are inserted into corresponding ones of the notches of the second bobbin 8, external periphery of the notches is pressed, and the engaging portions of the second bobbin 8 are made in an engaged state. As a result, the second outer magnetic pole portions 3a to 3e of the second stator 3 are fixed relative to the second bobbin 8 in both a direction extending parallel to and a rotational direction around the rotating shaft 6.

Similarly, when the second outer magnetic pole portions 3a to 3e of the second stator 3 are inserted into corresponding ones of the notches of the first bobbin 7, external periphery of the notches is pressed by the second outer magnetic pole portions 3a to 3e of the second stator 3, whereby the engaging portions of the first bobbin 7 are made in an engaged state. As a result, the first outer magnetic pole portions 2a to 2e of the first stator 2 are also fixed relative to the first bobbin 7 in both a direction extending parallel to and a rotational direction around the rotating shaft 6.

Whereupon the first and second bobbins 7, 8 are fixedly affixed together, to complete the assembly of the stepping motor.

As explained above, according to the present embodiment, when the first outer magnetic pole portions 2a to 2e of the first stator 2 are inserted into the jaw portions of the second bobbin 8, the second outer magnetic pole portions 3a to 3e of the second stator 3 are also made in an engaged state with the second bobbin 8. As a result, the second outer magnetic pole portions 3a to 3e of the second stator 3 are fixed relative to the second bobbin 8 in both the direction extending parallel to and the rotational direction around the rotating shaft 6.

Similarly, when the second outer magnetic pole portions 3a to 3e of the second stator 3 are inserted into corresponding ones of the jaw portions of the first bobbin 7, the first outer magnetic pole portions 2a to 2e of the first stator 2 are also made in an engaged state with the first bobbin 7. As a result, the first outer magnetic pole portions 2a to 2e of the first stator 2 are fixed relative to the first bobbin 7 in both the direction extending parallel to and the rotational direction around the rotating shaft 6.

Thus, during the assembly of the first and second stator/bobbin units, the outer magnetic pole portion of the first stator 2 serves as a switching member for shifting the engaging portions of the second bobbin 8 from the disengaged state to the engaged state. The outer magnetic pole portion of the second stator 3 serves as a switching member for shifting the engaging portions of the first bobbin 7 from the disengaged state to the engaged state. As a result, the first stator and the first bobbin are fixed together and the second stator and the second bobbin are fixed together. This makes it possible to attain a compact stepping motor without increasing the number of component parts by eliminating the necessity of additionally using members for fixing the first stator and the first bobbin together and the second stator and the second bobbin together, and without the need of reducing the diameters of the rotating shaft and bearings.

Second Embodiment

Figure 4:
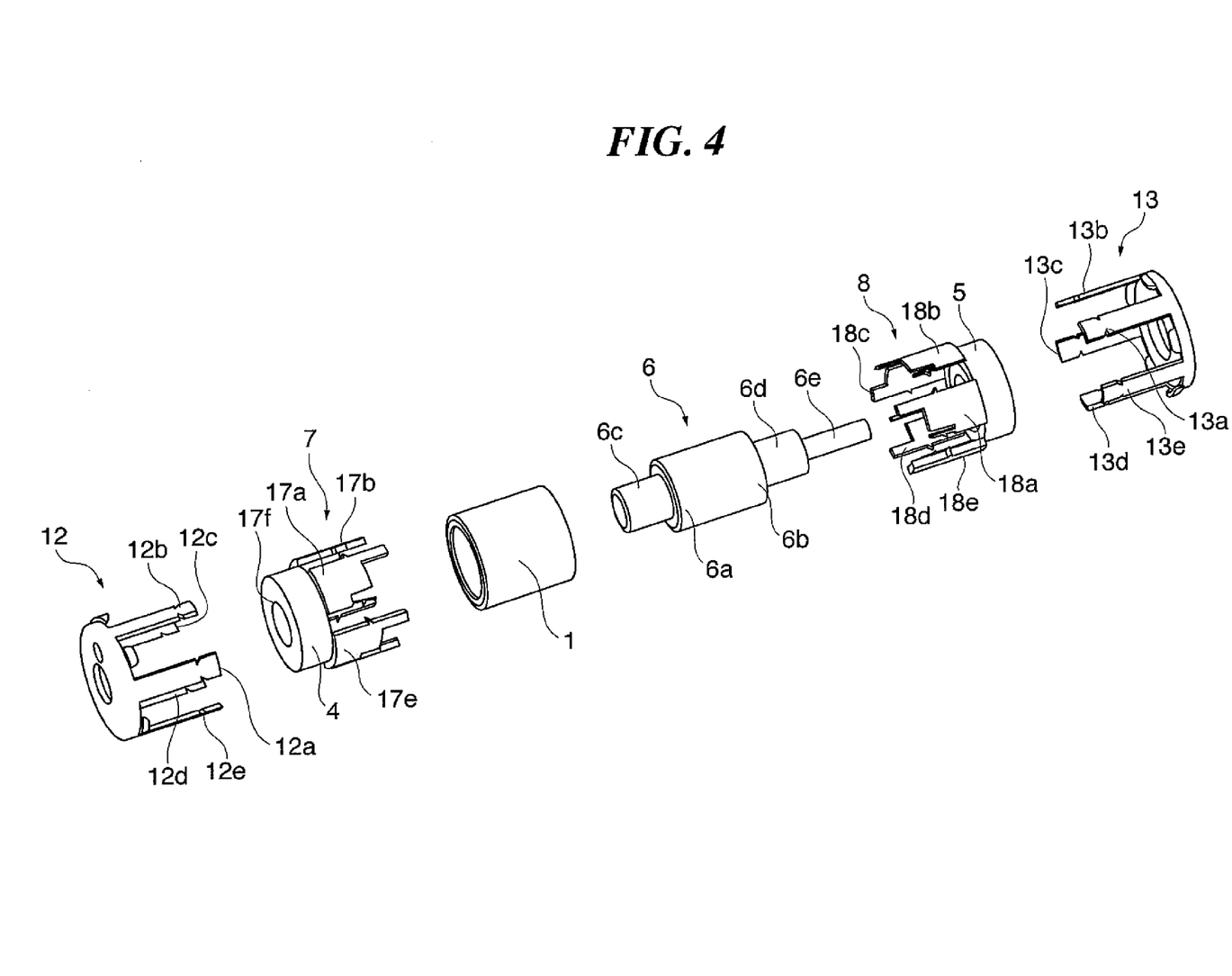
FIG. 4 is an exploded perspective view showing the construction of a stepping motor as a driving apparatus according to a second embodiment of the present invention.
Figure 5A:
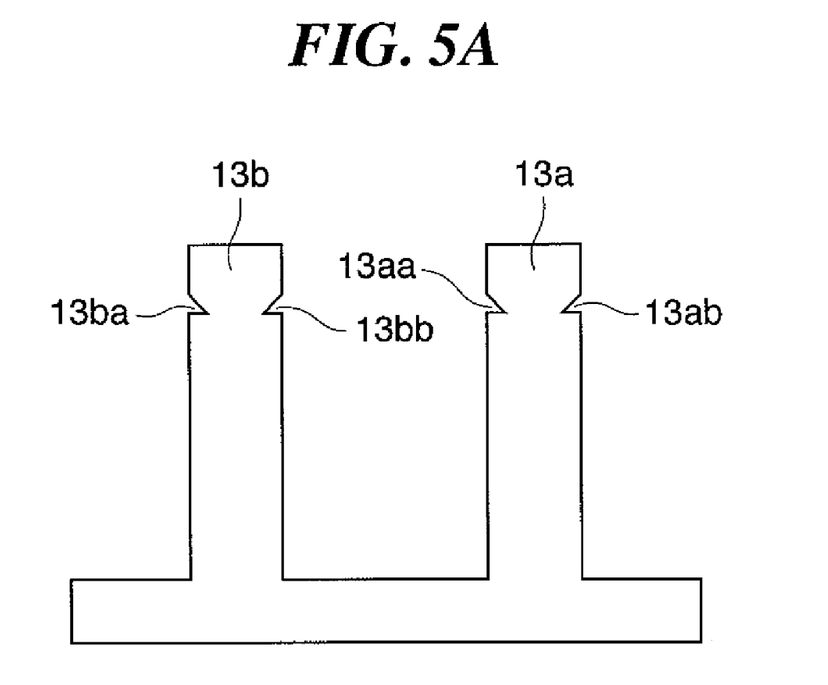
FIG. 5A is a fragmentary development view showing outer magnetic pole portions of a second stator of the stepping motor in FIG. 4.
Figure 5B:
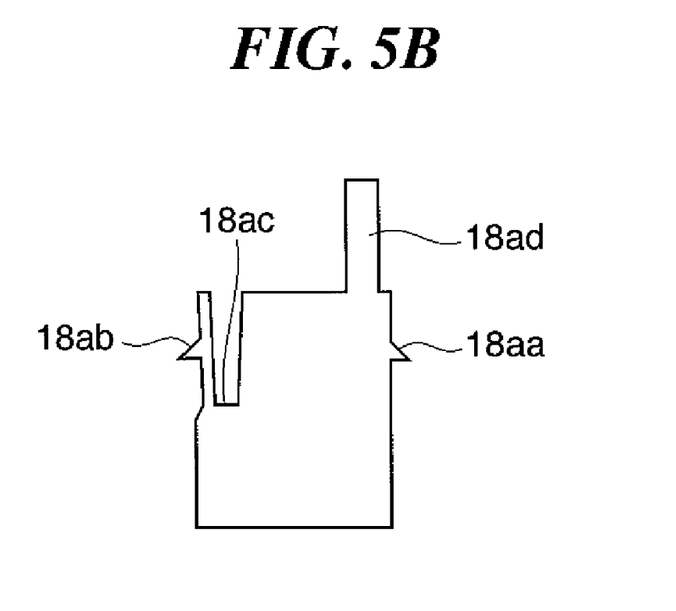
FIG. 5B is a fragmentary development view showing jaw portions of a second bobbin of the stepping motor in FIG. 4.
Figure 6A:
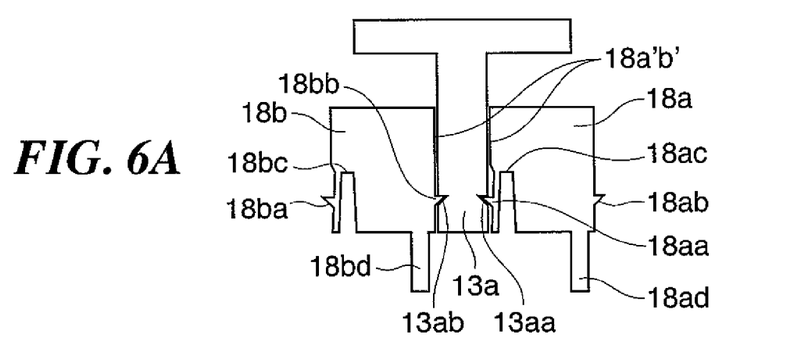
FIG. 6A is a fragmentary development view showing the outer magnetic pole portions of the second stator and the jaw portions of the second bobbin of the stepping motor in FIG. 4.

FIG. 4 is an exploded perspective view showing the construction of a stepping motor as a driving apparatus according to a second embodiment of the present invention. FIG. 5A is a fragmentary development view showing outer magnetic pole portions of a second stator of the stepping motor, and FIG. 5B is a fragmentary development view showing jaw portions of a second bobbin of the stepping motor. FIG. 6A is a fragmentary development view showing the outer magnetic pole portions of the second stator and the jaw portions of the second bobbin of the stepping motor, FIG. 6B is a fragmentary development view showing outer magnetic pole portions of a first stator and jaw portions of a first bobbin of the stepping motor, and FIG. 6C is a fragmentary development view showing the outer magnetic pole portions of the first and second stators and the jaw portions of the first and second bobbins.

Figure 6B:
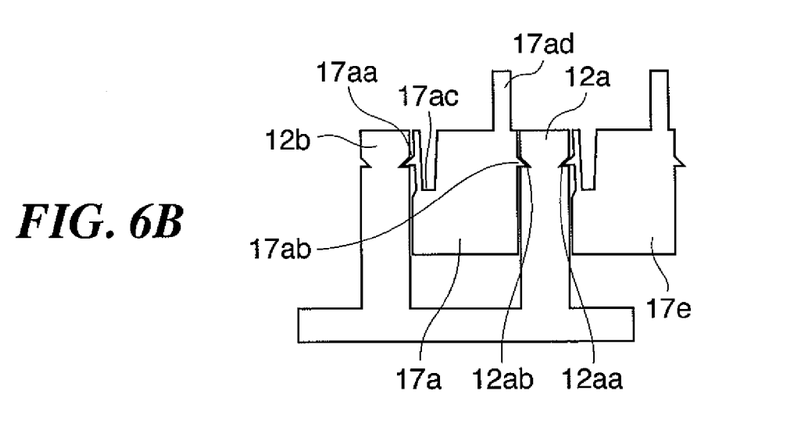
FIG. 6B is a fragmentary development view showing outer magnetic pole portions of a first stator and jaw portions of a first bobbin of the stepping motor in FIG. 4.
Figure 6C:
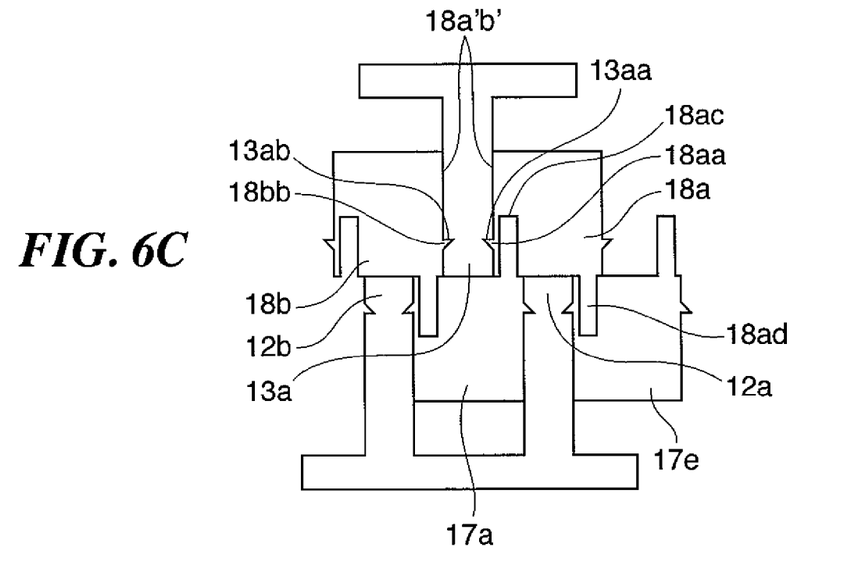
FIG. 6C is a fragmentary development view showing the outer magnetic pole portions of the first and second stators and the jaw portions of the first and second bobbins of the stepping motor in FIG. 4.

Referring to FIGS. 4 to 6, the stepping motor is comprised of a magnet 1, first and second stators 12, 13, first and second coils 4, 5, a rotating shaft 6, and first and second bobbins 17, 18.

The present embodiment differs from the first embodiment in the following points. Like elements common to both the present embodiment and the first embodiment (FIG. 1) are denoted by like reference numerals, and explanations thereof will be omitted.

The first stator 12 is made of a soft magnetic material and includes a circular disk-shaped base portion and first tooth-shaped outer magnetic pole portions 12a to 12e axially extending from the base portion and circumferentially disposed at equal intervals. The first outer magnetic pole portions 12a to 2e are formed with notches 12aa, 12ab; 12ba, 12bb; 12ca, 12cb; 12da, 12db; and 12ea, 12eb. It should be noted that only those notches which are formed in some of the first outer magnetic pole portions are illustrated in FIG. 2, with illustrations of the other notches omitted.

The second stator 13 is made of a soft magnetic material and includes a circular disk-shaped base portion and second tooth-shaped outer magnetic pole portions 13a to 13e axially extending from the base portion and circumferentially disposed at equal intervals. The second outer magnetic pole portions 13a to 13e are formed with notches 13aa, 13ab; 13ba, 13bb; 13ca, 13cb; 13da, 13db; and 13ea, 13eb. In FIG. 6, only notches formed in some of the second outer magnetic pole portions are illustrated, with illustrations of the other notches omitted.

The first bobbin 17 is formed by resin molding and comprised of a cylindrical portion 17f and tooth-shaped jaw portions 17a to 17e axially extending from the cylindrical portion 17f. The first coil 4 is wound around the outer circumference of the cylindrical portion 17f. The jaw portion 17a is formed with projections 17aa, 17ab, a notch 17ac, and a tip end portion 17ad. Each of the other jaw portions 17b to 17e is formed with similar projections, a notch, and a tip end portion.

The second bobbin 8 is formed by resin molding and comprised of a cylindrical portion 18f (not shown in FIG. 4) and tooth-shaped jaw portions 18a to 18e axially extending from the cylindrical portion 8f. The second coil 5 is wound around the outer periphery of the cylindrical portion 18f. The jaw portion 18a is formed with projections 18aa, 18ab, a notch 18ac, and a tip end portion 18ad. Each of the other jaw portions 18b to 18e is formed with similar projections, notches, and a tip end portion.

Next, explanations will be given of how the stepping motor of the present embodiment is assembled and how the first stator 12 and the first bobbin 17 are fixed together and the second stator 13 and the second bobbins 18 are fixed together.

First, the first stator 12 and the first bobbin 17 are assembled into a first stator/bobbin unit and the second stator 13 and the second bobbin 18 are assembled into a second stator/bobbin unit. In the following, a detailed explanation will be given.

As in the first embodiment, the second stator/bobbin unit of the present embodiment is made as follows: Specifically, as shown in FIG. 6A, there is a slight clearance between the second outer magnetic pole portion 13a of the second stator 12 and the engaging portion 18a'b' between the jaw portions 18a, 18e of the second bobbin 18, so that the second stator and the second bobbin are in a disengaged state. As in the first embodiment, the first stator/bobbin unit is also made in a disengaged state.

In the following, an explanation will be given of how the first and second stator/bobbin units are assembled and fixed together. In the first embodiment, there has been explained the case where the outer magnetic pole portions of the first and second stators serve as switching members for making a shift between the engaged state and the disengaged state of the engaging portions of the first and second bobbins. On the other hand, the first and second bobbins serve as switching member in this embodiment. The details thereof will be explained below.

As shown in FIGS. 6A to 6C, when the tip end portion 17ad of the first bobbin 17 is inserted into the notch 18ac formed in the jaw portion 18a of the second bobbin 18, external periphery of the notch 18ac is pressed by the tip end portion 17ad of the first bobbin 17, whereby the projections 18aa, 18bb of the second bobbin 18 are made in engagement with the notches 13aa, 13ab of the second stator 13. As a result, the engaging portion 18a'b' of the second bobbin 18 is made in an engaged state, so that the second outer magnetic pole portion 13a of the second stator 13 is fixed.

Similarly, when the remaining tip end portions of the first bobbin 17 are inserted into corresponding ones of the notches of the second bobbin 18, external peripheries of the notches are pressed, and the engaging portions of the second bobbin 18 are made in an engaged state. As a result, the second outer magnetic pole portions 13a to 13e of the second stator 13 are fixed relative to the second bobbin 18 in both a direction extending parallel to and a rotational direction around the rotating shaft 6.

Similarly, when the tip end portions of the second bobbins 18 are inserted into corresponding ones of the notches of the first bobbin 17, external peripheries of the notches are pressed, whereby the engaging portions of the first bobbin 17 are made in an engaged state. As a result, the first outer magnetic pole portions 12a to 12e of the first stator 12 are also fixed relative to the first bobbin 17 in both a direction extending parallel to and a rotational direction around the rotating shaft 6.

According to the present embodiment, as described above, during the assembly of the first and second stator/bobbin units, the first and second bobbins serve as switching members. As a result, the first stator and the first bobbin are fixed together and the second stator and the second bobbin are fixed together. This makes it possible to attain a compact stepping motor without increasing the number of component parts by eliminating the necessity of using additional members for fixing the first stator and the first bobbin together and the second stator and the second bobbin together, and without the need of reducing the diameters of the rotating shaft and bearings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-007974, filed Jan. 16, 2006 which is hereby incorporated by reference herein in its entirety.

What is claimed is:

1. A driving apparatus comprising:
a cylindrical magnet circumferentially magnetized;
a first stator for being excited by a first coil;
a second stator for being excited by a second coil;

a first bobbin for fixing said first coil, said first bobbin including at least one first engaging portion for being shifted between a disengaged state from said first stator and an engaged state with said first stator;
a second bobbin for fixing said second coil, said second bobbin including at least one second engaging portion for being shifted between a disengaged state from said second stator and an engaged state with said second stator;
at least one first switching member for shifting said first engaging portion of said first bobbin from the disengaged state from said first stator to the engaged state with said first stator when a first stator unit assembled from said first stator and said first bobbin is coupled to a second stator unit assembled from said second stator and said second bobbin; and
at least one second switching member for shifting said second engaging portion of said second bobbin from the disengaged state from said second stator to the engaged state with said second stator when the first stator unit is coupled to the second stator unit,
wherein said first switching member is provided in said second stator, and said second switching member is provided in said first stator,
when said first stator is coupled to said second bobbin, said second switching member provided in said first stator causes the second engaging portion of said second bobbin to shift from the disengaged state from said second stator to the engaged state with said second stator, and
when said second stator is coupled to said first bobbin, said first switching member provided in said second stator causes the first engaging portion of said first bobbin to shift from the disengaged state from said first stator to the engaged state with said first stator;
wherein said first stator includes a first stator base portion and a plurality of first tooth-shaped magnetic pole portions axially extending from said first stator base portion, at least one of said first magnetic pole portions having a tip end portion thereof forming said second switching member;
said second stator includes a second stator base portion and a plurality of second tooth-shaped magnetic pole portions axially extending from said second stator base portion, at least one of said second magnetic pole portions having a tip end portion thereof forming said first switching member;
said first bobbin includes a first bobbin base portion and a plurality of tooth-shaped first jaw portions thereof axially extending from said first bobbin base portion and each having opposite side edges, at least one of said first jaw portions being provided with said first engaging portion in at least one of the opposite side edges thereof, each of said first magnetic pole portions being inserted between corresponding adjacent ones of said first jaw portions, and said at least one first jaw portion or at least one different first jaw portion being formed with at least one first recess into which said first switching member formed by the tip end portion of said second magnetic pole portion can be inserted;
said second bobbin includes a second bobbin base portion and a plurality of tooth-shaped second jaw portions thereof axially extending from said second bobbin base portion and each having opposite side edges, at least one of said second jaw portions being provided with said second engaging portion in at least one of the opposite side edges thereof, each of said second magnetic pole portions being inserted between corresponding adjacent ones of said first jaw portions, and said at least one first jaw portion or at least one different first jaw portion being formed with at least one second recess into which said second switching member formed by the tip end portion of said first magnetic pole portion can be inserted.

2. A driving apparatus comprising:
a cylindrical magnet circumferentially magnetized;
a first stator for being excited by a first coil;
a second stator for being excited by a second coil;
a first bobbin for fixing said first coil, said first bobbin including at least one first engaging portion for being shifted between a disengaged state from said first stator and an engaged state with said first stator;
a second bobbin for fixing said second coil, said second bobbin including at least one second engaging portion for being shifted between a disengaged state from said second stator and an engaged state with said second stator;
at least one first switching member for shifting said first engaging portion of said first bobbin from the disengaged state from said first stator to the engaged state with said first stator when a first stator unit assembled from said first stator and said first bobbin is coupled to a second stator unit assembled from said second stator and said second bobbin; and
at least one second switching member for shifting said second engaging portion of said second bobbin from the disengaged state from said second stator to the engaged state with said second stator when the first stator unit is coupled to the second stator unit,
wherein said first switching member is provided in said second bobbin, and said second switching member is provided in said first bobbin,
when said first bobbin is coupled to said second bobbin, said second switching member provided in said first bobbin causes the second engaging portion of said second bobbin to shift from the disengaged state from said second stator to the engaged state with said second stator, and
when said second bobbin is coupled to said first bobbin, said first switching member provided in said second bobbin causes said first engaging portion of said first bobbin to shift from the disengaged state from said first stator to the engaged state with said first stator;
wherein said first stator includes a first stator base portion and a plurality of tooth-shaped first magnetic pole portions axially extending from said first stator base portion;
said second stator includes a second stator base portion and a plurality of tooth-shaped second magnetic pole portions axially extending from said second stator base portion;
said first bobbin includes a first bobbin base portion and a plurality of tooth-shaped first jaw portions thereof axially extending from said first bobbin base portion and each having opposite side edges, at least one of the first jaw portions being provided with said first engaging portion in at least one of the opposite side edges thereof, each of said first magnetic pole portions being inserted between corresponding adjacent ones of said first jaw portions, and said at least one first jaw portion or at least one different first jaw portion has a tip end portion thereof forming said second switching member;
said second bobbin includes a second bobbin base portion and a plurality of tooth-shaped second jaw portions thereof axially extending from said second bobbin base portion and each having opposite side edges, at least one of said second jaw portions being provided with said second engaging portion in at least one of the opposite side edges thereof, each of said second magnetic pole portions being inserted between corresponding adjacent ones of the second jaw portions, and said at least one second jaw portion or at least one different second jaw portion has a tip end portion thereof forming said first switching member;

said first bobbin is formed with at least one first recess into which the tip end portion of the second jaw portion of said second bobbin forming said first switching member can be inserted; and said second bobbin is formed with at least one second recess into which the tip end portion of the first jaw portion of said first bobbin forming said second switching member can be inserted.

3. The driving apparatus comprising:

a cylindrical magnet circumferentially magnetized;

a first stator for being excited by a first coil;

a second stator for being excited by a second coil;

a first bobbin for fixing said first coil, said first bobbin including at least one first engaging portion for being shifted between a disengaged state from said first stator and an engaged state with said first stator;

a second bobbin for fixing said second coil, said second bobbin including at least one second engaging portion for being shifted between a disengaged state from said second stator and an engaged state with said second stator;

at least one first switching member for shifting said first engaging portion of said first bobbin from the disengaged state from said first stator to the engaged state with said first stator when a first stator unit assembled from said first stator and said first bobbin is coupled to a second stator unit assembled from said second stator and said second bobbin; and at least one second switching member for shifting said second engaging portion of said second bobbin from the disengaged state from said second stator to the engaged state with said second stator when the first stator unit is coupled to the second stator unit, wherein said first and second stators each include tooth-shaped magnetic pole portions axially extending; and said first and second bobbins each include tooth-shaped jaw portions axially extending.

* * * * *